(12) United States Patent
Evdokimo

(10) Patent No.: US 7,596,828 B2
(45) Date of Patent: Oct. 6, 2009

(54) MULTIPLE BLADE WINDSHIELD WIPER

(76) Inventor: Arnold W. Evdokimo, 4453 W. Kitty Hawk, Chandler, AZ (US) 85226

( * ) Notice: Subject to any disclaimer, the term of this patent is extended or adjusted under 35 U.S.C. 154(b) by 0 days.

(21) Appl. No.: 11/845,403

(22) Filed: Aug. 27, 2007

(65) Prior Publication Data
US 2009/0056050 A1    Mar. 5, 2009

(51) Int. Cl.
*B60S 1/28* (2006.01)
*B60S 1/38* (2006.01)

(52) U.S. Cl. ............ 15/250.4; 15/250.41; 15/250.44; 15/250.33

(58) Field of Classification Search ............ 15/250.4, 15/250.41, 250.48, 250.46, 250.44, 250.451–250.454, 15/250.33
See application file for complete search history.

(56) References Cited

U.S. PATENT DOCUMENTS

| | | | | |
|---|---|---|---|---|
| 2,173,021 A | * | 9/1939 | Longwell et al. | 15/250.04 |
| 2,265,266 A | * | 12/1941 | Cote | 15/250.41 |
| 2,701,382 A | * | 2/1955 | Oishei | 15/250.43 |
| 3,238,555 A | * | 3/1966 | Cels | 15/250.04 |
| 3,638,274 A | | 2/1972 | Farver | |
| 3,892,006 A | | 7/1975 | Yasumoto | |
| 4,103,384 A | * | 8/1978 | Priesemuth | 15/250.03 |
| 4,567,621 A | | 2/1986 | Alley, Jr. | |
| 4,698,874 A | * | 10/1987 | Fritz, Jr. | 15/250.48 |
| 4,719,661 A | | 1/1988 | Hanselmann | |
| 4,745,653 A | | 5/1988 | Bliznak | |
| 5,168,595 A | | 12/1992 | Naylor, Jr. | |
| 5,235,720 A | | 8/1993 | Kinder | |
| 5,392,488 A | * | 2/1995 | Li | 15/250.41 |
| 5,625,919 A | * | 5/1997 | Jeffer | 15/250.41 |
| 6,119,300 A | | 9/2000 | Schmid et al. | |
| 6,505,378 B1 | | 1/2003 | Squires | |
| 6,748,621 B1 | | 6/2004 | Root | |

FOREIGN PATENT DOCUMENTS

| | | | |
|---|---|---|---|
| JP | 56-138048 | * | 10/1981 |
| KR | 1999-0024416 U. | | 7/1999 |
| KR | 2001-0059693 | | 7/2001 |
| WO | WO 83/02756 | | 8/1983 |

OTHER PUBLICATIONS

Abstract of Japanese publication 56-138048, published Oct. 1981.*

* cited by examiner

*Primary Examiner*—Gary K Graham
(74) *Attorney, Agent, or Firm*—George E. Haas; Quarles & Brady LLP

(57) ABSTRACT

A windshield wiper blade assembly has a blade arm to which a blade subassembly is pivotally coupled. The blade subassembly includes a first blade, a second blade, and a third blade located side-by-side. The first and third blades are formed of a scrubbing material for debris and the second blade is formed of a rubber-like material. Movement in a first direction causes engagement with the windshield to exert a force that pivots the blade subassembly into a first position in which the first and second blades contact the windshield and the third blade is spaced from the windshield. Movement in an opposite second direction causes engagement with the windshield to exert another force which pivots the blade subassembly into a second position in which the second and third blades are in contact with the windshield and the first blade is spaced from the windshield.

10 Claims, 1 Drawing Sheet

MULTIPLE BLADE WINDSHIELD WIPER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to a wiper assembly for wiping a windshield of a motor vehicle, and more particularly to such an assembly that has multiple blades for removing different substances from the windshield.

2. Description of the Related Art

The motor vehicles, such as automobiles, motorcycles and aircraft, commonly have a mechanism for wiping rain water and debris from the windshield to enable the driver to see the road ahead. Typically there is a pair arms that that move in an oscillating manner over the windshield when driven by a motor. A separate windshield wiper blade assembly carried at an end of each arm moves in an arcuate path across the windshield.

The conventional automobile windshield wiper blade assembly is sufficient for wiping water and water soluble materials from the windshield, but is ineffective for removing substances which are not water soluble, such as bugs, secretions from trees, road dirt, grease and oil.

Heretofore, attempts have been made to provide a windshield wiper blade assembly for cleaning non-water soluble materials as well as water from the windshield. One type of previous device, shown in U.S. Pat. No. 4,567,621, used a single composite blade in which a scrubbing strip was sandwiched between two conventional wiper blades. Gaps were eliminated between the three blade components so that dirt removed from the windshield could not accumulate therein.

Windshield wiper assemblies with multiple blades also have been proposed. U.S. Pat. No. 5,168,595 discloses a combination of three different types of blades with one of them being tilted into an operating position by an electrically operated actuator. This mechanism required that the driver of the vehicle operate a switch to select the particular blade to use. U.S. Pat. No. 4,745,653 shows three blades arranged in a "Y" configuration with a sponge located between two of the blades. The driver of the vehicle manually rotated the blade assembly about the center axis of the "Y" to select which ones of the blades and the sponge engaged the windshield. The vehicle driver had be outside the car to position the blade assembly.

SUMMARY OF THE INVENTION

A windshield wiper blade assembly is provided for attachment to a driving arm that oscillates in a first direction and in a second direction across a windshield of a vehicle. That windshield wiper blade assembly includes a blade arm adapted to connect to the driving arm and a blade subassembly pivotally attached to the blade arm. The blade subassembly has a first blade, a second blade, and a third blade mounted side-by-side for engaging the windshield. Movement in the first direction causes engagement with the windshield to exert a force which pivots the blade subassembly into a first position in which the first and second blades contact the windshield and the third blade is spaced from the windshield. Movement in the second direction causes engagement with the windshield to exert another force which pivots the blade subassembly into a second position in which the second and third blades contact the windshield and the first blade is spaced from the windshield.

In a preferred embodiment the blade arm and the blade subassembly pivot about a rod coupled to both the blade arm and the blade subassembly. The blade subassembly includes a support strip to which the first, second, and third blades are secured and the support strip has a plurality of mounts pivotally coupled to the rod.

In another aspect of the windshield wiper blade assembly, the first and third blades are formed of a scrubbing material, that preferably is porous and has an abrasive surface which does not scratch glass. The second blade is formed of a rubber-like material. Preferably the second blade is between the first and third blades.

DETAILED DESCRIPTION OF THE INVENTION

Figure 1:
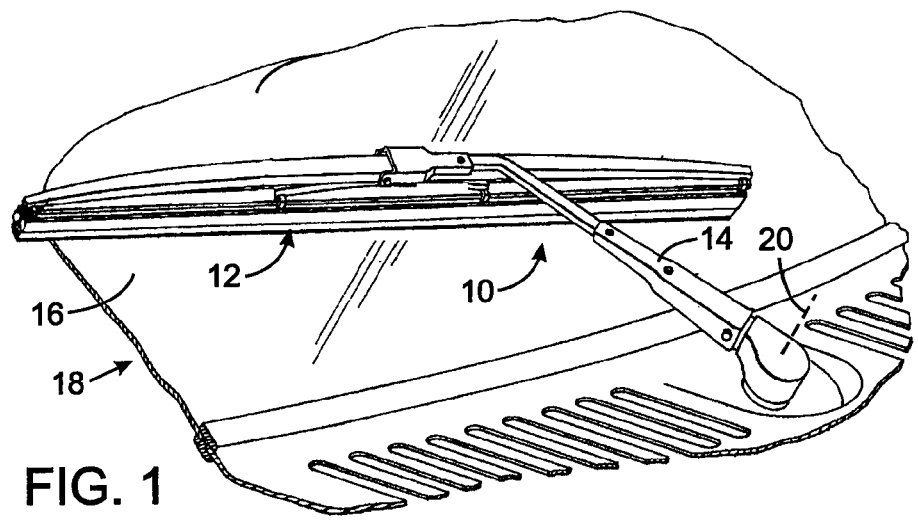
FIG. 1 is a perspective view of a windshield wiper blade assembly constructed according to the present invention connected to an oscillating driving arm of a motor vehicle.

With initial reference to FIG. 1, a windshield wiper mechanism 10 includes a windshield wiper blade assembly 12 removably attached to an end of a driving arm 14 for cleaning and wiping the windshield 16 of a motor vehicle 18. The other end of the driving arm 14 is connected to a shaft of a motor drive that oscillates about an axis 20. That oscillating action drags the windshield wiper blade assembly 12 across the windshield 16 in an arc, thereby removing water and debris from the surface of the windshield.

Figure 2:
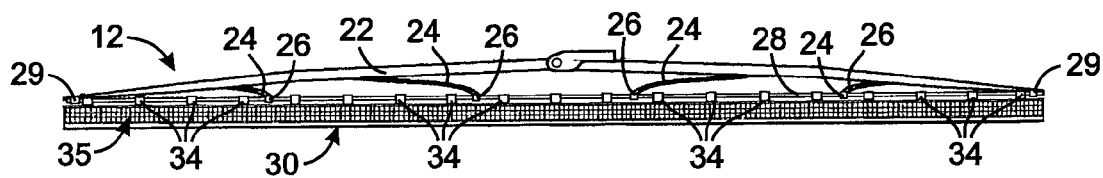
FIG. 2 is a side view of the windshield wiper blade assembly showing a blade arm holding a blade subassembly.

With reference to FIG. 2, the windshield wiper blade assembly 12 includes a blade arm 22 that is bowed away from a blade subassembly 30. The wiper blade assembly 12 is of a conventional construction having a U-shaped cross section with an opening of the U facing downward toward the blade subassembly 30, in the orientation of the components in FIG. 2. A plurality of blade carriers 24 have one end attached to the wiper blade assembly 12 from which each blade carrier extends in a downwardly and horizontally curving manner. The remote end of each blade carrier 24 has a fitting 26 through which a rod 28 slideably extends. A similar fitting 29 is located at each end of the blade arm 22 and slideably receives the rod 28.

Figure 3:
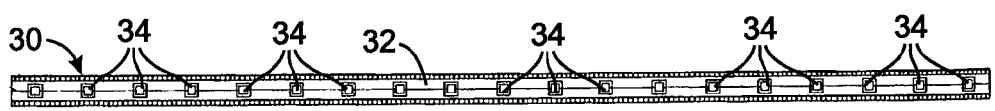
FIG. 3 is a top view of the blade subassembly.

With reference to FIGS. 2 and 3, the windshield wiper blade assembly 12 also includes the blade subassembly 30 that is mounted on the rod 28. The blade subassembly 30 comprises a support strip 32 extending the length of the wiper blade assembly and from which a plurality of mounts 34 project upwardly with a hole through which the rod 28 extends. This mounting technique allows the blade subassembly 30 to pivot about the rod 28 in a reciprocating manner when the wiper blade assembly 12 oscillates across the windshield 16, as will be described.

Figure 4:
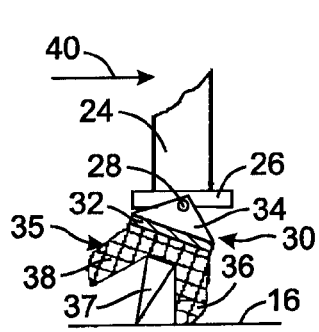
FIGS. 4, 5 and 6 are partial end views illustrating the windshield wiper blade assembly in three operating positions.

With additional reference to FIG. 4, the blade subassembly 30 has a blade structure 35 comprising three wiper blades 36, 37 and 38 projecting from the length of the support strip 32 toward the windshield 16. The three blades are located side-by side in parallel along the length of the support strip 32 with second blade 37 positioned between the first and third blades 36 and 38. The second, or center, blade 37 is a conventional rubber or rubber-like material commonly used for windshield wiper blades. The second blade 37 tapers from a relatively wide section at the support strip 32 to a thin edge for engaging the windshield surface. The outer first and third blades 36 and 38 are formed of a scrubbing material similar to that of pads used for cleaning kitchen pots and pans. For example, the scrubbing blades may have a sponge-like, porous core with an outer nylon web or a coating of abrasive particles, which will not scratch glass, however a blade formed of a homogeneous material may be used. The scrubbing blades are particularly adapted for removing insects and other materials that become attached to the surface of the windshield 16 and which a conventional rubber blade cannot remove satisfactorily. To provide a scrubbing action, each of the first and third blades 36 and 38 has a large surface area that contacts the windshield, as compared to the contact area of the second blade 37. Preferably, the first and third blades 36 and 38 are formed of the identical scrubbing material, however different scrubbing materials may be used for cleaning different substances for the windshield.

The trio of blades 36-38 is formed by producing a generally U-shaped body in which the two scrubbing blades 36 and 38 form the legs of the U. Then the rubber center blade 37 is secured in the opening of the U to form a third leg between and parallel to the first two legs. Alternatively, the trio of blades can be formed by a single extrusion of multiple materials. The combination of the three blades is secured to the underside of the blade carrier 32.

In operation, a spring mechanism of the conventional driving arm 14 applies a force that urges the windshield wiper blade assembly 12 against the windshield 16 of the motor vehicle, see FIG. 1. The spring action provided by the blade carriers 24 distributes that force across the length of the blade subassembly 30 so that the blades 36-38 uniformly contact the surface of the windshield 16 with adequate force to properly remove water and debris.

As noted previously, the driving arm 14 swings the blade assembly 12 in an arc across the surface of the windshield 16 with an oscillating motion. In a first direction of that oscillation, denoted by arrow 40 in FIG. 4, the blade subassembly 30 pivots about the rod 28 due to the force exerted thereon by engagement with the windshield 16. That is, friction between the first and second blades 36 and 37 and the windshield surface resists motion of the blades in the first direction, thereby pivoting the subassembly into the illustrated first position with respect to the blade arm 22 and the blade carriers 24. In this first position, one scrubber blade 36 and the center conventional blade 37 engage the surface of the windshield 16 and the other scrubber blade 38 is lifted from the windshield surface. The first blade 36 scrubs any debris from the windshield while the second blade 37 functions as a squeegee to remove water from the windshield surface.

Figure 5:
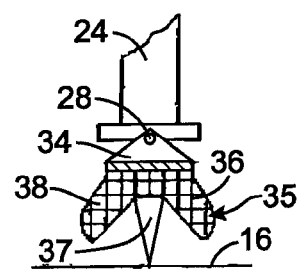

When the windshield wiper blade assembly 12 reaches an end of the oscillation arc in the first direction and the driving arm 14 reverses the direction of motion. At that time, the blade subassembly 30 momentarily pivots into a centered position depicted in FIG. 5 in which the first and third scrubber blades 36 and 38 are lifted from the windshield surface and only the second, center, blade 37 engages the windshield 16. Raising the first scrubber blade 36 from the surface of the windshield causes its sponge material to expand, upon being released from compression against the windshield, which causes insects and other debris that collected thereon to be thrown off, thus depositing that debris at the end of the motion arc.

Figure 6:
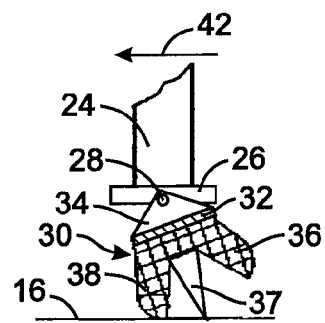

Continued motion in the opposite second direction of oscillation, as indicated by arrow 42 in FIG. 6, causes the blade subassembly 30 to continue pivoting about the rod 28 until the third blade 38 contacts the surface of windshield 16. In this second position of the blade subassembly 30 with respect to the blade arm 22 and the blade carriers 24, the first blade 36 is raised from the windshield surface. The windshield wiper blade assembly 12 remains in the second position during the remainder of arcuate motion in the second direction. Now the third blade 38 produces a scrubbing action while the second wiper blade 37 squeegees rain water that struck the windshield after the first pass of the windshield wiper blade assembly 12. The motion of the windshield wiper blade assembly 12 in the second direction continues until reaching the other end of the oscillation arc at which time the driving arm 14 reverses direction. This causes the wiper blade subassembly 30 to pivot again through the center position into the first position depicted in FIG. 4 from which the oscillation cycle repeats.

The present windshield wiper blade assembly 12 causes various blades 36, 37, and 38 to selectively engage the surface of the windshield 16 in response to forces produced from the normal oscillating motion of the windshield wiper mechanism. Different ones of the three blades contact the surface of the windshield in different portions of that cycle without requiring either a separate powered actuator or manual operation of the assembly. Furthermore, the driver does not have to consciously select between different modes of operation of the blade mechanism, but merely has to turn the wiper mechanism on and off.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A windshield wiper blade assembly, for use with a driving arm that oscillates in a first direction and in a second direction across a windshield of a vehicle, the windshield wiper blade assembly comprising:

a blade arm adapted to be connected to and carried by the driving arm, and comprising a plurality of fittings spaced among a length of the blade arm;

a rod extending longitudinally along the blade arm and engaging the plurality of fittings;

a blade subassembly with a plurality of mounts engaging attached to the rod wherein at least one of the blade arm and the blade subassembly pivots about the rod and the blade subassembly having a first blade, a second blade, and a third blade mounted side-by-side for engaging the windshield, wherein movement in the first direction causes engagement with the windshield to exert a force which pivots the blade subassembly into a first position in which the first and second blades contact the windshield and the third blade is spaced from the windshield, and wherein movement in the second direction causes engagement with the windshield to exert another force which pivots the blade subassembly into a second position in which the second and third blades contact the windshield and the first blade is spaced from the windshield.

2. The windshield wiper blade assembly as recited in claim 1 wherein the blade subassembly comprises a support strip to which the first, second, and third blades are secured.

3. The windshield wiper blade assembly as recited in claim 2 wherein the plurality of mounts are secured to the support strip.

4. The windshield wiper blade assembly as recited in claim 2 wherein the support strip has at least four mounts pivotally coupled to the rod.

5. The windshield wiper blade assembly as recited in claim 1 wherein the first and third blades are formed of a scrubbing material.

6. The windshield wiper blade assembly as recited in claim 5 wherein the scrubbing material is porous and has an abrasive surface that does not scratch glass.

7. The windshield wiper blade assembly as recited in claim 1 wherein the second blade is formed of a rubber-like material.

8. The windshield wiper blade assembly as recited in claim 1 further comprising a plurality of blade carriers attached to and projecting from the blade arm and one of the plurality of fittings being attached to each of the plurality of blade carriers.

9. The windshield wiper blade assembly as recited in claim 1 wherein movement between the first and second positions is caused only by forces exerted on the blade subassembly by engagement with the windshield.

10. The windshield wiper blade assembly as recited in claim 1, wherein the plurality of fittings comprises at least three fittings spaced among a length of the blade arm.

* * * * *